United States Patent [19]

Cvijanovich

[11] Patent Number: 4,625,401

[45] Date of Patent: Dec. 2, 1986

[54] METHOD OF GOLD COATING AN ARTICLE

[75] Inventor: George B. Cvijanovich, Winston-Salem, N.C.

[73] Assignee: AMP Incorporated, Harrisburg, Pa.

[21] Appl. No.: 775,716

[22] Filed: Sep. 16, 1985

Related U.S. Application Data

[60] Division of Ser. No. 623,639, Jun. 25, 1984, abandoned and a continuation-in-part of Ser. No. 364,168, Mar. 31, 1984, abandoned.

[51] Int. Cl.$^4$ .......................................... H01R 43/00
[52] U.S. Cl. .................................... 29/885; 228/112; 228/113; 339/278 C; 427/11
[58] Field of Search ............... 29/889; 427/11; 228/2, 228/112, 113; 339/278 C

[56] References Cited

U.S. PATENT DOCUMENTS

| | | | |
|---|---|---|---|
| 622,732 | 4/1899 | Thurston | 428/469 |
| 661,650 | 11/1900 | Thurston | 428/553 |
| 706,702 | 8/1902 | Thurston | 427/11 |
| 1,324,835 | 12/1919 | McCoy | 427/11 |
| 2,582,685 | 1/1952 | Eisler | 427/11 X |
| 2,640,002 | 5/1953 | Clayton | 427/11 X |
| 2,914,425 | 11/1959 | McGuire | 117/111 |
| 3,092,704 | 6/1963 | Woody et al. | 339/278 C |
| 3,132,093 | 5/1969 | Clayton | 427/11 X |
| 3,525,066 | 8/1970 | Magee et al. | 339/278 C |
| 3,551,184 | 3/1967 | Dremann | 427/11 |
| 3,927,841 | 12/1975 | Iacobucci | 339/278 C |
| 4,178,193 | 12/1979 | Kanter | 148/6 |
| 4,265,508 | 5/1981 | Chisholm | 339/276 SF |
| 4,352,534 | 10/1982 | Johnson | 339/278 C |

FOREIGN PATENT DOCUMENTS 54-137964  10/1979  Japan ....................................... 427/11

Primary Examiner—Mark Rosenbaum
Assistant Examiner—Carl J. Arbes
Attorney, Agent, or Firm—Katherine A. Nelson

[57] ABSTRACT

A method for solid phase welding gold to electrical contact terminals is disclosed. The contact zones of the terminals are moved past and held against a rotating cylinder that has gold electrolytically deposited thereon. The gold is transferred from the cylinder to the contact zones of the terminals by friction welding. The deposited gold is also described.

2 Claims, 6 Drawing Figures

MICRO METERS OF GOLD

| LOCATION OF MEAS. | RUN NO. | | | |
|---|---|---|---|---|
| | 1 | 2 | 3 | 4 |
| A | 0.002 | 0.241 | | |
| B | 0.013 | 0.183 | 0.122 | 0.089 |
| C | 0.041 | 0.135 | 0.091 | 0.904 |
| D | 0.587 | 0.227 | 0.168 | 0.549 |
| E | 0.124 | 0.107 | 0.137 | 0.935 |
| F | 0.127 | 0.162 | 0.208 | 0.272 |
| G | 0.018 | 0.178 | | 0.010 |

METHOD OF GOLD COATING AN ARTICLE

This application is a division of application Ser. No. 623,639 filed June 25, 1984 now abandoned, and a continuation-in-part of Ser. No. 364,168 filed Mar. 31, 1984, now abandoned.

FIELD OF THE INVENTION

This invention relates to methods of applying gold to electrical contact terminals.

BACKGROUND OF THE INVENTION

The use of gold on electrical contacts is well established in the electronic industry. Gold's high reliability under repeated use, its resistance to corrosion, and low contact resistance, makes it an outstanding material for coating electrical contacts, especially those used in low voltage devices.

Gold is traditionally applied to electrical contacts by electroplating the gold from aqueous solutions of gold complexes, usually cyanides or chlorides. The electronics industry in response to escalating gold prices and ever increasing economic pressures has developed sophisticated equipment for continuous and selective plating of gold in spots and stripes on strips of metal components. There are, however, a number of problems associated with electroplating gold, such as contamination of the baths accompanied by the codeposition of undesirable materials on the contacts; restriction of the range of current usable to obtain optimum plating thus limiting the speed at which components may be plated; waste due to excessive coverage; and hazards associated with the use of such poisonous compounds as potassium cyanide. Concomitant with these are the associated problems of the disposal of the hazardous industrial waste.

The invention disclosed herein, was developed to alleviate a number of the aforementioned problems. This alleviation is primarily achieved by reducing the amount of electroplating to a minimum. Electroplating is required only to plate gold on the stainless steel cylinder. The gold is then transferred from the cylinder to the strips of electrical contact by solid phase welding.

Solid phase welding of gold has been known since antiquity. Studies of early artifacts reveal that gold boxes were welded by pressure welding the joints with a small hammer. Gold inlaid articles were formed by hammering gold into insized lines in various metals. Gold has also been welded to itself and to other metals by clamping the items together and heating the clamped assembly for a period of time.

Dynamic friction welding has also been used to bond gold to itself and other metals. In dynamic friction welding one component is rotated against another under an axial load to generate frictional heat. Once a sufficient temperature has been reached, rotation is then stopped, the weld is completed, and the two components are bonded to each other. The disclosed invention utilizes principles of dynamic friction welding to transfer gold that has been electroplated on a steel cylinder to strips of electrical contacts.

The gold plated cylinder is rotated at a high speed. A strip of electrical contact terminals is held against a rotating cylinder under sufficient normal force to generate frictional heat. As the cylinder continues to rotate, sliding friction is replaced by massive seizure. The gold from the cylinder is welded to the terminal accompanied by the simultaneous shearing of a layer of gold from the rotating cylinder.

The electrical contact terminal to be coated with gold, according to the invention, must be pre-treated in the same manner as electrical contacts which are to be electroplated. A substratum, usually nickel, is first plated on the contact zone in order to prevent diffusion of the base metal into the gold layer. In addition, to accomplish the desired transfer of gold to the contact zone by dynamic friction welding, the substratum must have a shear strength greater than that of the shear strength of pure gold. Nickel also fulfills this requirement. Further, it is important that the electrical contact used with this invention, like contacts that are to be electroplated, be free of organics and other contaminates prior to the application of the gold.

PREFERRED EMBODIMENT

Figure 1:
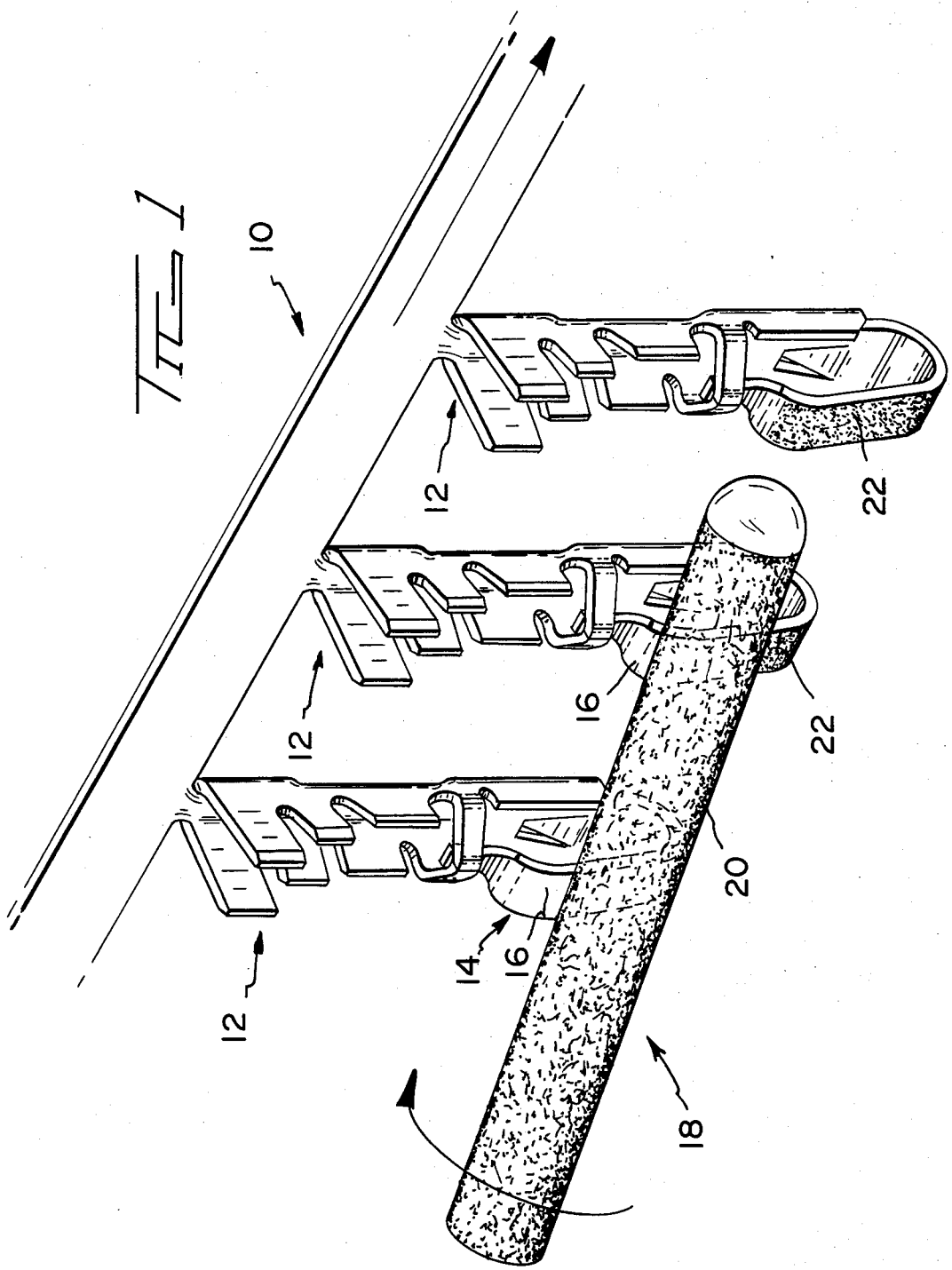
FIG. 1 shows a gold coated electrical contact terminal and illustrates the method used to apply the gold coating to the terminal.
Figure 2:
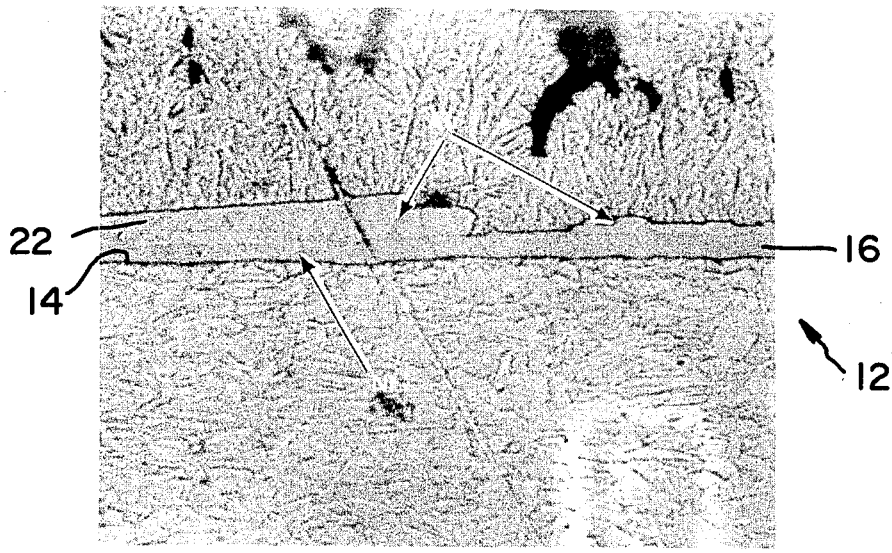
FIG. 2 is a micrograph of a cross-section of the contact zone of a terminal showing the structure of the gold coating which was applied by the above method, the magnification being 1,000 times.
Figure 3:
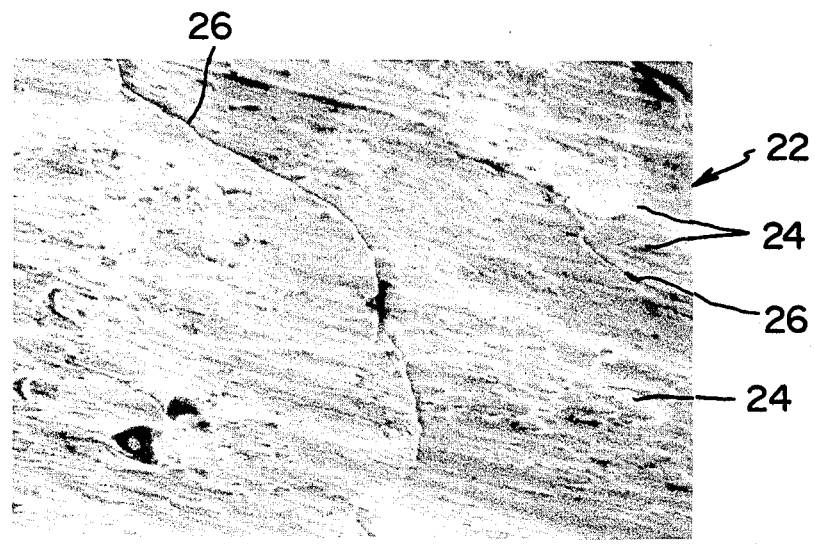
FIG. 3 is a surface view of the gold coating on the terminal of FIG. 2 using an AMR scanning electron microscope with Kavex Line X-Ray Fluorescence Detector, the magnification being 2,000 times.
Figure 4:
FIG. 4 is a view of the top surface of the terminal of FIG. 2 showing the gold coating at the lower left and the nickel substrate at the upper right. THe surface was magnified 75 times using the AMR scanning electron microscope.
Figure 5:
FIG. 5 shows the gold map of the contact surface of FIG. 4 magnified 75 times.

Referring to FIG. 1, a strip 10 of electrical contact terminals 12, each terminal having a contact zone 14 with nickel substrate 16 thereon is moved past and held against a rotating rod 18 having gold 20 electrolytically deposited thereon. The gold 20 is transferred by friction welding from the rod 18 to the contact zone 14 resulting in the deposition of a layer of gold 22 on the contact zone 14. FIG. 2 is a cross-sectional view of electrical contact terminal 12, contact surface 14 having the nickel substrate 16 and the frictionally welded gold coating 22 thereon. FIG. 3 shows a closeup surface view of the gold coating 22 on the contact zone 14. This view shows the striated structure 24 of the gold coating 22 and the imbrications 26 in this striated surface. FIG. 3 further indicates the directional nature of the striations 24 in the imbrications 26. FIG. 4 shows contact zone 14 of an electrical contact terminal 12 magnified 75 times. The gold coating 22 is at the lower edge of the figure and the nickel substrate 16 is at the upper edge. FIG. 5 is the gold map of the same contact zone 14 which is illustrated in FIG. 4.

Samples used to illustrate this invention were prepared in the following manner. A one-eighth inch steel drill rod was first plated with nickel flash using a standard Barrett nickel sulfamate bath purchased from Allied Kelite Corporation. The bath contained 24 grams of nickel per liter of solution. The rod was plated at 48.9°

C. for 30 seconds using a current density of 0.016 amps per square centimeter. A one mil layer of gold was then plated onto the cylinder using a citrate based gold bath with cobalt hardener. Baths of this type are widely known in the industry. The particular commercial bath used in preparing the rod utilized in the invention was Englehard E-75 gold bath, purchased from Englehard Industries. The bath contained 12.74 grams of gold per liter of solution and had a pH of 4 to 4.5. The rod was plated at 54.4° C. for 50 minutes using a current density of 0.016 amps per square centimeter. The resulting gold layer plated from this bath contains from 0.15 to 0.25% cobalt.

Figure 6:
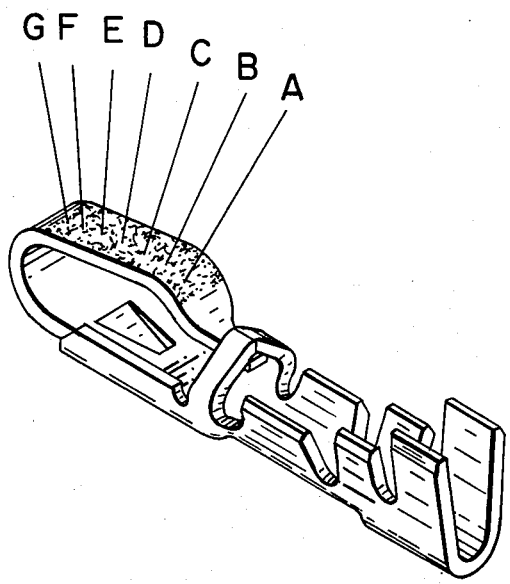
FIG. 6 is a view of a gold plated terminal illustrating the locations for the X-ray Fluorescence measurements given in the table.

The plated rod was inserted in a hand-held variable speed drill. The rod was rotated at a speed of about 16–18,000 rpm. A strip of electrical contact members was moved past and held against the revolving rod. The results of several test runs are shown in the table in FIG. 6. Thickness measurements were made at several points on each contact zone using a Daini Seikosha X-ray Fluorescence machine Model SFT 156. FIG. 6 illustrates the locations of the series of gold thickness measurements made on the terminals.

It is apparent from the measurements given in the table, that the thickness of the gold welded to the contact zone of the terminal was non-uniform. This non-uniformity was due to the fact that the tools and contacts were hand-held and that variables such as the pressure exerted between the terminals and the gold plated rod, the length of time the terminal remained in contact with the rod, and the angle of incidence were not uniform for successive runs. These variables are more easily controlled by using automatic and securely mounted equipment. Further, the exact area to be coated with gold can be adjusted by controlling the angle of incidence. Notwithstanding the non-uniformity, it is also apparent that gold thicknesses of the same order of magnitude as electrodeposited gold can be obtained by the practice of this invention. It is evident from the table in FIG. 6 that even serviceable terminals (runs 1 and 4) can be made even under hand-held conditions.

The structure of the surface of these contacts was investigated using an AMR scanning electron microscope with Kevex Line X-Ray Fluorescence Detector. The micrographs show the surface of the gold coating is directionally striated and imbricated. The cross section micrographs of the coating reveal that successive sheared layers of gold have been welded to the terminal.

What is claimed is:

1. A process for coating gold on a continuous strip of electrical contact terminals extending side by side from a carrier strip, each terminal having a contact zone which is intended to engage and establish electrical contact with a complementary contact member, comprising the steps of:
   electrolytically depositing gold on a cylinder,
   rotating the gold coated cylinder,
   feeding a strip of terminals past the rotating cylinder,
   holding the contact zones of the terminals against the rotating cylinder with sufficient normal force to cause dynamic frictional welding of the gold to the contact zone.

2. A process for coating gold on a continuous strip of electrical contact terminals as recited in claim 1 in which dynamic frictional welding comprises the step of:
   applying a normal force to the contact zones of the terminals as they are held against the rotating cylinder until the sliding friction between the contact zones and the cylinder is replaced by massive seizure accompanied by the simultaneous shearing of a layer of gold from the rotating cylinder onto the electrical contact terminal.

* * * * *